United States Patent
Kolar et al.

(10) Patent No.: US 10,008,954 B2
(45) Date of Patent: Jun. 26, 2018

(54) SWITCHING FREQUENCY MODULATION IN A SWITCHED MODE POWER SUPPLY

(71) Applicant: Infineon Technologies Austria AG, Villach (AT)

(72) Inventors: Johann Kolar, Zurich (CH); Matthias Kasper, Zurich (CH); Cheng-Wei Chen, New Taipei (TW)

(73) Assignee: Infineon Technologies Austria AG, Villach (AT)

( * ) Notice: Subject to any disclaimer, the term of this patent is extended or adjusted under 35 U.S.C. 154(b) by 0 days. days.

(21) Appl. No.: 15/294,552

(22) Filed: Oct. 14, 2016

(65) Prior Publication Data

US 2018/0109198 A1    Apr. 19, 2018

(51) Int. Cl.
*H02M 7/06* (2006.01)

(52) U.S. Cl.
CPC ..................... *H02M 7/06* (2013.01)

(58) Field of Classification Search
CPC ............... H02M 7/06; H02M 3/157; H02M 2001/0012; H02M 1/00; H02M 3/33515; H02M 3/156
See application file for complete search history.

(56) References Cited

U.S. PATENT DOCUMENTS

| | | | |
|---|---|---|---|
| 5,488,627 A | 1/1996 | Hardin et al. | |
| 7,508,278 B2* | 3/2009 | Chen | H04B 15/02 331/16 |
| 7,773,016 B2* | 8/2010 | Miao | H02M 3/157 323/282 |
| 9,281,745 B2* | 3/2016 | Zoso | H02M 3/157 |
| 2002/0175720 A1* | 11/2002 | Huang | H02M 1/088 327/108 |
| 2006/0153421 A1* | 7/2006 | Tachibana | G06T 1/0028 382/100 |
| 2008/0303501 A1* | 12/2008 | Prodic | H02M 3/157 323/283 |
| 2013/0016844 A1* | 1/2013 | Llewellyn | H03K 4/023 381/59 |
| 2014/0368242 A1* | 12/2014 | Unruh | H03L 1/00 327/156 |

OTHER PUBLICATIONS

Gonzalez, D., et al., "Conducted EMI Reduction in Power Converters by Means of Periodic Switching Frequency Modulation," IEEE Transactions on Power Electronics, vol. 22, No. 6, Nov. 2007, pp. 2271-2281.

(Continued)

*Primary Examiner* — Emily P Pham
(74) *Attorney, Agent, or Firm* — Slater Matsil, LLP

(57) ABSTRACT

In accordance with an embodiment, a method includes driving at least one electronic switch coupled to at least one inductor in a converter stage of a switched mode power supply based on a clock signal, and modulating a clock frequency of the clock signal over a predefined first frequency range around a center frequency such that a frequency spectrum of the clock signal is asymmetric. The switched mode power supply includes a filter coupled between the converter stage and an input of the switched mode power supply.

20 Claims, 8 Drawing Sheets

(56) References Cited

OTHER PUBLICATIONS

Jianting, L., et al., "Jitter Frequency Modulation—A Technique that Can Reduce EMI Noise Level of Switch Mode Power Supply Effectively," Aug. 2006, pp. 820-823.

Pareschi, F., et al., "Practical Optimization of EMI Reduction in Spread Spectrum Clock Generators with Application to Switching DC/DC Converters," IEEE Transactions on Power Electronics, vol. 29, No. 9, Sep. 2014, pp. 4646-4657.

Raggl, K., et al., "Model Based Optimization of EMC Input Filters," 11th Workshop in Conference: Control and Modeling for Power Electronics, Sep. 2008, pp. 1-6.

* cited by examiner

SWITCHING FREQUENCY MODULATION IN A SWITCHED MODE POWER SUPPLY

TECHNICAL FIELD

This disclosure in general relates to a switched mode power supply, particularly a switching frequency modulation in a switched mode power supply.

BACKGROUND

Switched mode power supplies (SMPS) are widely used in various types of automotive, industrial, household or consumer electronic applications. A switched mode power supply includes at least one electronic switch coupled to at least one inductor of an inductive rectifier circuit. A switched mode power supply is configured to receive an input power which is given by an input current multiplied with an input voltage at an input and supply an output power which is given by an output voltage multiplied with an output current to a load coupled to an output. By regulating the input power received at the input the switched mode power supply may regulate at least one operation parameter, for example, the output voltage, the output current, or the input current. The input power is regulated by regulating a current through the at least one inductor, whereas the inductor current is regulated by a switched mode operation of the at least one electronic switch.

The switched mode operation of the at least one electronic switch may include operating the electronic switch in a plurality of successive drive cycles, with each drive cycle including an on-time in which the at least one electronic switch is switched on and an off-time in which the at least one electronic switch is switched off. Furthermore, the switched mode operation may include switching on the at least one electronic switch at a predefined switching frequency and varying a duration of the on-time.

The switched mode operation of the at least one electronic switch may cause interferences. If the switching frequency is a fixed frequency an energy of a frequency spectrum of the interferences (interference spectrum) is concentrated at the fixed frequency and its harmonics. By modulating the switching frequency around a center frequency the energy of the interference spectrum can be distributed over a certain frequency range. In each case, however, it is undesirable for the interferences to reach a power source such as a power grid connected to the input. This is defined by standards such as CISPR Class A and Class B or IEC/EN 61000-3-2. In order to meet these standards an attenuation of the interferences by a filter coupled between the input and the at least one electronic switch may become necessary. Such a filter may account for a considerable share of the size and cost of the power supply.

It is therefore desirable to have a switched mode power supply that provides for an efficient filtering of interferences at low cost and low size.

SUMMARY

One example relates to a switched mode power supply. The switched mode power supply includes an input configured to receive an input power and an output configured to supply an output power, at least one a converter stage including at least one electronic switch and at least one inductor coupled to the at least one electronic switch, wherein the converter stage is coupled to the output, a filter coupled between the input and the converter stage, and a controller configured to drive the at least one electronic switch based on a clock signal. The controller is configured to modulate a clock frequency of the clock signal over a predefined first frequency range such that a frequency spectrum of the clock signal is asymmetric.

Another example relates to a method. The method includes driving at least one electronic switch coupled to at least one inductor in a converter stage of a switched mode power supply based on a clock signal, and modulating a clock frequency of the clock signal over a predefined first frequency range such that a frequency spectrum of the clock signal is asymmetric, wherein the switched mode power supply further comprises a filter coupled between the at least one converter stage and an input of the switched mode power supply.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
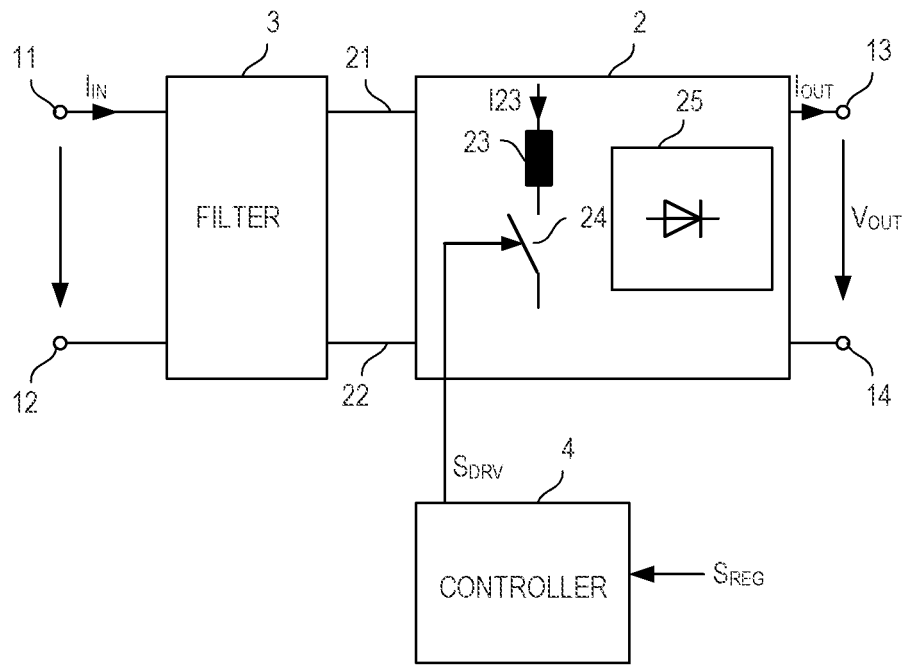
FIG. 1 shows a block diagram that illustrates one example of a switched mode power converter that includes a filter, a converter stage with at least one switch, and a controller configured to drive the at least one switch.

FIG. 1 shows a switched mode power converter circuit (switched mode power supply, SMPS) according to one embodiment. The switched mode power converter circuit is briefly referred to as power converter in the following. Referring to FIG. 1, the power converter includes an input configured to receive an input power and an output configured to supply an output power to a load Z (illustrated in dashed lines in FIG. 1). The input may include a first input node 11 and a second input node 12, and the output may include a first output node 13 and a second output node 14. The input power is given by an input current $I_{IN}$ multiplied with an input voltage $V_{IN}$ and the output power is given by an output current $I_{OUT}$ multiplied with an output voltage $V_{OUT}$. The power converter is configured to regulate at least one of its operation signals such as the output voltage $V_{OUT}$, the output current $I_{OUT}$, or the input current. This at least one signal is referred to as regulated signal in the following.

The power converter includes a converter stage 2 and a filter 3 coupled between the input 11, 12 of the power converter and an input 21, 22 of the converter stage. The converter stage 2 receives the input voltage $V_{IN}$ and the input current $I_{IN}$ via the filter 3. An output of the converter stage 2 is coupled to the output 13, 14 of the power converter circuit.

The converter circuit 2 includes at least one inductor 23 connected in series with an electronic switch 24 and a rectifier circuit 25 coupled between the at least one inductor 23 and the output 13, 14. The electronic switch 24 is driven by a drive signal $S_{DRV}$ generated by a controller 4, wherein the controller 4 generates the drive signal $S_{DRV}$ based on an input signal $S_{REG}$ that represents the at least one operation signal that is to be regulated. In FIG. 1 and other drawings explained below, the electronic switch 24 is only schematically illustrated. Any type of electronic switch may be used to implement the electronic switch 24 in the power converter circuit. Examples of the electronic switch 24 include, but are not restricted to, a MOSFET (Metal Oxide Semiconductor Field-Effect Transistor), an IGBT (Insulated Gate Bipolar Transistor), a HEMT (High Electron Mobility Transistor), in particular a Gallium-Nitride-(GaN)-HEMT, a BJT (Bipolar Junction Transistor), or the like.

The mode power converter is configured to regulate the at least one operation signal by regulating the input power and, therefore, regulating the output power. The input power is regulated by controlling a current I23 through the at least one inductor 23. The inductor current I23, in turn, is controlled by a switched mode operation of the at least one electronic switch 24. A switched mode operation of the at least one electronic switch 24 includes operating the at least one electronic switch 24 based on the drive signal $S_{DRV}$ in a plurality of successive drive cycles, with each drive cycle including an on-time in which the at least one electronic switch is switched on and an off-time in which the at least one electronic switch is switched off. Each of these drive cycles has a duty cycle that is given by $D=T_{ON}/T$, where $T_{ON}$ is a duration of the on-time and $T=T_{ON}+T_{OFF}$ is a duration of the drive cycle, where $T_{OFF}$ is a duration of the off-time. The inductor current I23 can be controlled by suitably adjusting the duty cycles D of the individual drive cycles.

The switched mode operation of the at least one electronic switch 24 may cause interferences (noise) on supply lines between the converter stage 2 and the input 11, 12. The filter 3 serves to filter or at least attenuate these interferences so as to prevent these interferences from negatively affecting a power source (not shown) that supplies the input power or interferences. The power source is a power grid, for example. Examples of the filter 3 are explained below. The input voltage $V_{IN}$ may be an alternating voltage such as sinusoidal grid voltage, a rectified alternating voltage such as a sinusoidal voltage rectified by a bridge rectifier, or a direct voltage. According to one example, the filter 3 is a lowpass filter and designed such that the voltage created by converter stage 2 at the input 21, 22 is filtered and substantially equal to the input voltage Vin received at the input 11, 12.

Figure 2:
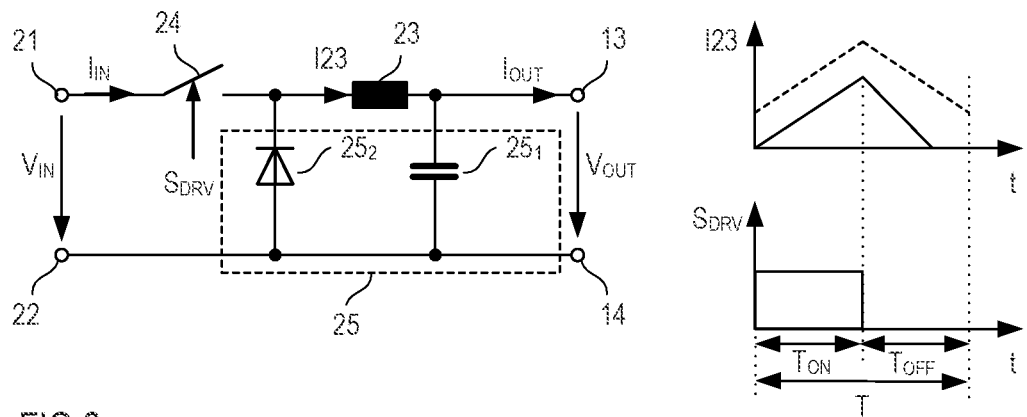
FIG. 2 illustrates one example of a converter stage with a buck converter topology and timing diagrams of signals occurring in this switched mode power converter.
Figure 3:
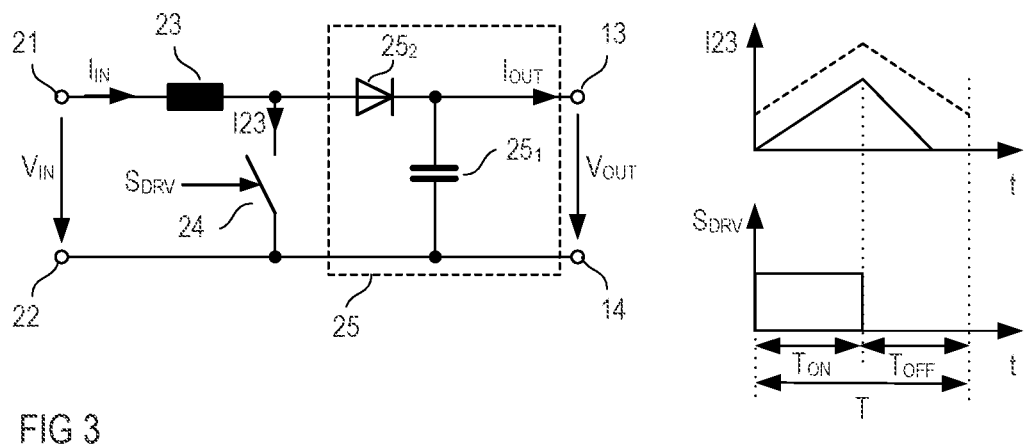
FIG. 3 illustrates one example of a converter stage with a boost converter topology and timing diagrams of signals occurring in this switched mode power converter.
Figure 4:
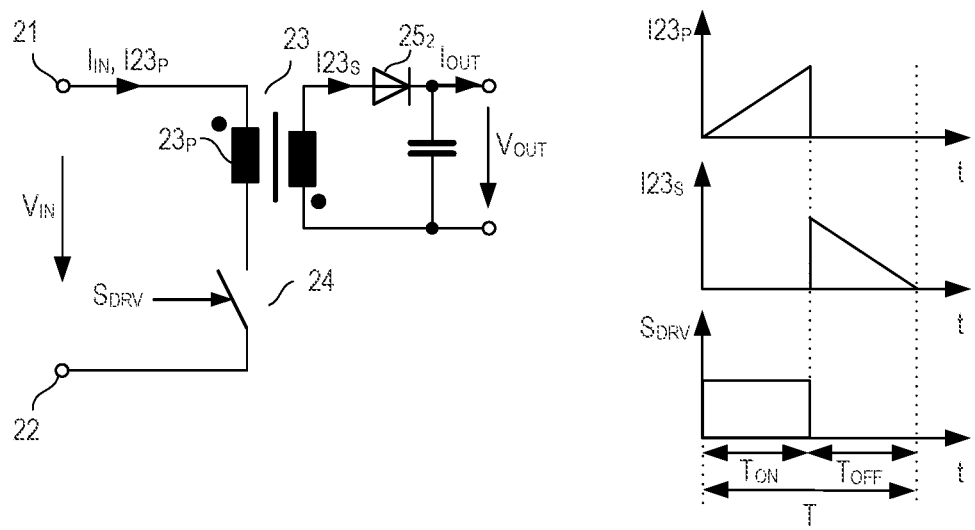
FIG. 4 illustrates one example of a converter stage with a flyback converter topology and timing diagrams of signals occurring in this switched mode power converter.

The converter stage 2 may be implemented in various different ways. Three examples of how the converter stage 2 may be implemented are illustrated in FIGS. 2 to 4 and explained below. The converter stage, however, is not restricted to be implemented in accordance with one of these examples. Besides the topology of the respective converter stage, FIGS. 2 to 4 illustrate the drive signal $S_{DRV}$ and the inductor current in one drive cycle. Just for the purpose of illustration, in these figures a high signal level of the drive signal $S_{DRV}$ represents an on-level that switches on the electronic switch 24 and a low signal level represents an off-level that switches off the electronic switch 24.

FIG. 2 illustrates a converter stage 2 with a buck converter topology (buck topology). In this topology, a series circuit with the electronic switch 24, the inductor 23 and a capacitor $25_1$ of the rectifier circuit 25 is connected between a first input node 21 and a second input node 22 of the converter stage. The output voltage $V_{OUT}$ is available across the capacitor $25_1$, which is connected between the first output node 13 and the second output node 14, whereas the second input node 22 of the converter stage 2 and the second output node 14 are formed by the same circuit node. A rectifier element $25_2$ of the rectifier circuit 25 is connected in parallel with a series circuit including the inductor 23 and the capacitor $25_1$.

Referring to the timing diagrams shown in FIG. 2, the inductor current I23 increases during the on-time, that is, when the electronic switch 24 is switched on, and decreases during the off-time. A slope of the inductor current I23 is substantially given by a voltage across the inductor 23 divided by an inductance L of the inductor 23. During the on-time, the voltage across the inductor 21 is given by the input voltage $V_{IN}$ minus the output voltage $V_{OUT}$ (whereas a voltage level of the input voltage $V_{IN}$ is higher than the voltage level of the output voltage $V_{OUT}$), so that the slope during the on-time is given by $(V_{IN}-V_{OUT})/L$. During the off-time, the voltage across the inductor 21 substantially equals the output voltage $V_{OUT}$, so that the slope is given by the output voltage $V_{OUT}$ divided by the inductance L, that is $V_{OUT}/L$. The converter stage may be operated in a discontinuous conduction mode (DCM) or in a continuous conduction mode. In DCM, which is illustrated in solid lines in FIG. 2, the inductor current I23 decreases to zero. In CCM, which is illustrated in dashed lines in FIG. 2, the inductor current I23 does not decrease to zero, that is, the electronic switch 24 again switches on before the current has decreased to zero.

FIG. 3 shows an example of a converter stage 2 with a boost converter topology (boost topology). In this topology, a series circuit with the inductor 24 and the electronic switch 24 is connected between the first input node 21 and the second input node 22 of the converter stage. A series circuit with the rectifier element $25_2$ and the capacitor $25_1$ of the rectifier circuit 25 are connected in parallel with the electronic switch 24, whereas the output voltage $V_{OUT}$, like in the topology shown in FIG. 2, is available across the capacitor $25_1$. The second input node 22 of the converter stage 2 and the second output node 14 are formed by the same circuit node in this topology.

During the on-time, that is, when the electronic switch 24 is switched on, a voltage across the inductor 23 substantially equals the input voltage $V_{IN}$, so that the slope of the inductor current I23 during the on-time is given by the input voltage $V_{IN}$ divided by the inductance L, $V_{IN}/L$. During the off-time, that is, after the electronic switch 23 has been switched off, the voltage across the inductor 23 equals the output voltage $V_{OUT}$ minus the input voltage $V_{IN}$, so that the slope of the inductor current I23 during the off-time is given by ($V_{OUT}-V_{IN}$)/L. The output voltage $V_{OUT}$ has a higher voltage level than the input voltage $V_{IN}$ in the power converter circuit with the boost topology. Like the buck converter shown in FIG. 2, the boost converter shown in FIG. 3 may be operated in DCM, which is illustrated in solid lines in the timing diagram shown in FIG. 3, or in CCM, which is illustrated in dashed lines in the timing diagram shown in FIG. 3.

FIG. 3 shows one example of a converter stage 2 with a flyback converter topology (flyback topology). In this topology, the inductor 23 is a transformer with a primary winding $23_P$ and a secondary winding $23_S$ that are inductively coupled. The primary winding $21_P$ is connected in series with the electronic switch 24, whereas this series circuit is connected between the first input node 21 and the second input node 22 of the converter stage. A series circuit with the secondary winding $23_S$ and the rectifier element $25A_2$ of the rectifier circuit 25 is connected in parallel with the capacitor $25_1$ of the rectifier circuit 25 whereas the capacitor $25_1$ is connected between the first output node 13 and the second output node 14. The output voltage $V_{OUT}$ is available across the capacitor $25_1$. The primary winding $23_P$ and the secondary winding $23_S$ have opposite winding senses. A winding ratio between the number of turns of the primary winding $23_P$ and the number of turns of the secondary winding $23_S$ is given by n:1, that is, the number of turns of the primary winding $23_P$ is n times the number of turns of the secondary winding $23_S$. In the flyback converter topology, during the on-time, a current $I23_P$ flows through the primary winding $23_P$ while the current through the secondary winding $21_S$ is zero. During the off-time, the current through the primary winding $23_P$ is zero and a current flows through the secondary winding $23_S$. The current $I23_P$ through the primary winding $23_P$ increases during the on-time, and the current through the secondary winding $23_S$ decreases during the off-time. A slope of the current $I23_P$ through the primary winding $23_P$ during the on-period is given by the input voltage $V_{IN}$ divided by the inductance L of the primary winding $23_P$. During the off-period, a slope of the current $I23_S$ through the secondary winding $23_S$ is given by $n \cdot V_{OUT}/L$, where n defines the winding ratio.

In the examples explained above, the rectifier element $25_2$ of the rectifier circuit 25 is drawn as a bipolar diode, which is a passive rectifier element. This, however, is only an example. Any other type of passive rectifier element such as a Schottky diode may be used as well. Furthermore, the rectifier element $25_2$ is not restricted to be implemented as a passive rectifier element, so that an active rectifier element may be used instead. According to one example, an active rectifier element includes at least one electronic switch that may be switched on or off dependent on a polarity of a voltage across the at least one electronic switch. Those active rectifiers are often referred to as synchronous rectifiers (SR). Furthermore, the rectifier circuit 25 is not restricted to only include one rectifier element and a capacitor, but a more complex rectifier circuit such as a rectifier circuit including a further inductor may be used as well.

Figure 5:
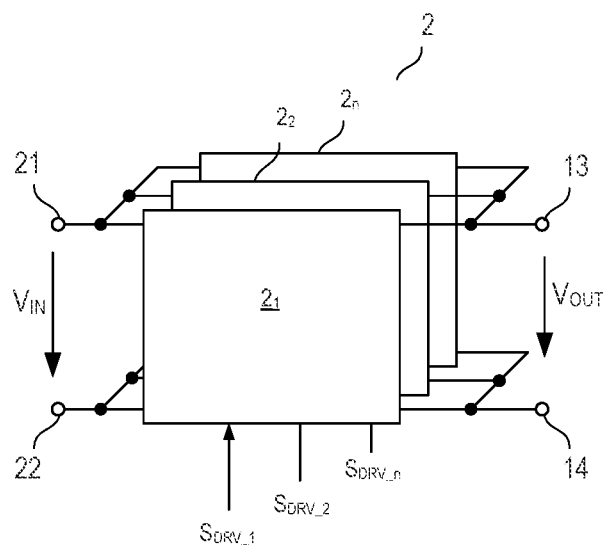
FIG. 5 illustrates one example of a switched mode power that includes several converter stages connected in parallel.

The power converter circuit shown in FIG. 1 includes one converter stage 2. This, however, is only an example. According to another example, which is schematically illustrated in FIG. 5, the power converter circuit includes several converter stages $2_1$, $2_2$, $2_n$ connected in parallel. "Connected in parallel" means that each of these converter stages $2_1$, $2_2$, $2_n$ is connected between the filter 3 and the output 13, 14. Each of these converter stages $2_1$, $2_2$, $2_n$ may be implemented in accordance with one of the topologies explained with reference to FIGS. 2 to 4. Each of these converter stages $2_1$, $2_2$, $2_n$ receives a respective drive signal $S_{DRV\_1}$, $S_{DRV\_2}$, $S_{DRV\_n}$. According to one example, the drive signals $S_{DRV\_1}$, $S_{DRV\_2}$, $S_{DRV\_n}$ are identical. According to another example, the drive signals $S_{DRV\_1}$, $S_{DRV\_2}$, $S_{DRV\_n}$ have the same duty cycle but there is a time shift between the individual drive signals $S_{DRV\_1}$, $S_{DRV\_2}$, $S_{DRV\_n}$ in order to operate the individual converter stages $2_1$, $2_2$, $2_n$ in an interleaved fashion.

Figure 6:
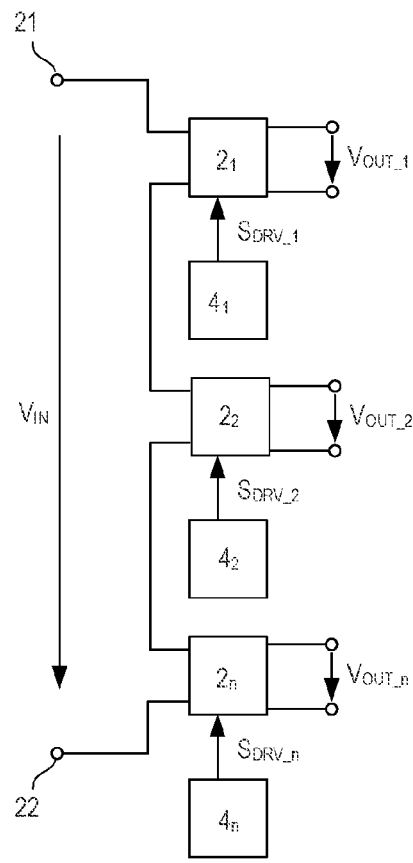
FIG. 6 illustrates one example of a switched mode power that includes several converter stages connected in series.

According to yet another example, which is shown in FIG. 6, the power converter circuit includes a plurality of converter stages $2_1$, $2_2$, $2_n$ that have their inputs connected in series such that each of the converter stage receives as an input voltage a portion of the input voltage $V_{IN}$ received by filter 3. Each of the converter stages $2_1$, $2_2$, $2_n$ generates an output voltage $V_{OUT\_1}$, $V_{OUT\_2}$, $V_{OUT\_n}$ based on its respective input voltage. At least one electronic switch (not shown in FIG. 6) in each of the converter stages $2_1$, $2_2$, $2_n$ is driven by a drive signal $S_{DRV\_1}$, $S_{DRV\_2}$, $S_{DRV\_n}$ generated by a respective controller $4_1$, $4_2$, $4_n$.

In the following, drive signal $S_{DRV}$ denotes the drive signal of a converter stage in a power converter circuit with only one converter stage or one of the drive signals $S_{DRV\_1}$, $S_{DRV\_2}$, $S_{DRV\_n}$ in a power converter circuit with several converter stages. Equivalently, controller 4 denotes the controller of a converter stage in a power converter circuit with only one converter stage or one of the controllers 4 in a power converter circuit with several converter stages.

Figure 7:
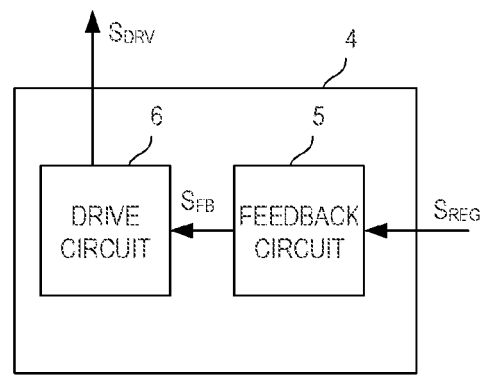
FIG. 7 shows a block diagram of one example of the controller.

FIG. 7 schematically illustrates one example of a controller 4. The controller includes a feedback circuit 5 configured to receive the regulated signal $S_{REG}$ and generate a feedback signal $S_{FB}$ based on the regulated signal $S_{REG}$. A drive circuit 6 receives the feedback signal $S_{FB}$ and generates the drive signal $S_{DRV}$ based on the feedback signal $S_{FB}$. The input signal $S_{REG}$ shown in FIG. 7 represents the signal of the power converter circuit that is to be regulated such as the output voltage $V_{OUT}$ or the output current $I_{OUT}$. This input signal $S_{REG}$ may be obtained by measuring the signal to be regulated using a conventional measurement circuit (not shown in the drawings). According to one example, the controller input signal $S_{REG}$ is proportional to the signal that is to be regulated.

Figure 8:
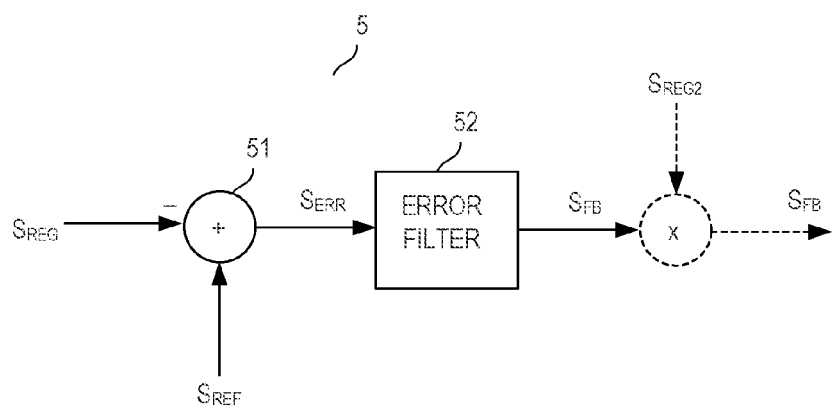
FIG. 8 shows one example of a feedback circuit included in the controller shown in FIG. 7.
Figure 9:
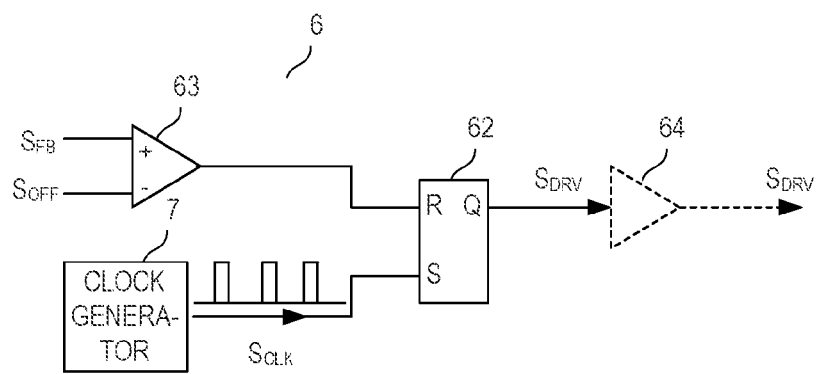
FIG. 9 shows one example of a drive circuit included in the controller shown in FIG. 7.

Block diagrams of examples of the feedback circuit 5 and the drive circuit 6 are shown in FIGS. 8 and 9. It should be noted that these block diagrams illustrate functional blocks of the feedback circuit 5 and the drive circuit 6 rather than specific implementations. The functional blocks shown in FIGS. 8 and 9 can be implemented in various ways. According to one example, these functional blocks are implemented using dedicated circuitry. According to another example, these functional blocks are implemented using hardware and software. According to one example, a microcontroller and software running on the microcontroller realizes the function of the feedback circuit 5 and the drive circuit 6.

In the example shown in FIG. 8, the feedback circuit 5 includes a subtractor 51 that receives the regulated signal $S_{REG}$ and a reference signal $S_{REF}$ and calculates an error signal $S_{ERR}$ based on the reference signal $S_{REF}$ and the regulated signal $S_{REG}$. The reference signal $S_{REF}$ represents a set value (desired value) of the signal that is to be regulated, and the error signal $S_{ERR}$ represents a difference between the reference signal $S_{REF}$ and the signal that is to be regulated. A filter 52 (error filter) receives the error signal $S_{ERR}$ and generates the feedback signal $S_{FB}$ based on the error signal $S_{ERR}$. The error filter 52 may have one of a proportional (P), proportional-integral (PI), integral (I) or proportional-integral-derivative (PID) characteristic. According to one example, the input signal $S_{REG}$ represents one of the output voltage $V_{OUT}$ and the output current $I_{OUT}$ of the power converter circuit. In this example, either the output voltage $V_{OUT}$ or the output current $I_{OUT}$ is regulated such that a value of this signal is substantially equal to a value represented by the reference signal $S_{REF}$.

According to a modification illustrated in dashed lines in FIG. 8, the feedback signal $S_{FB}$ is provided by a multiplier 53 that receives the error filter output signal of the error filter 52 and a second input signal $S_{REG2}$ that represents another signal that is to be regulated. According to one example, the second input signal $S_{REG2}$ represents the input voltage $V_{IN}$ and the input signal $S_{REG}$ represents one of the output voltage $V_{OUT}$ and the output current $I_{OUT}$. A controller 4 that generates the feedback signal $S_{FB}$ in this way may be configured to regulate one of the output voltage $V_{OUT}$ and the output current $I_{OUT}$ and at the same time regulate the input current $I_{IN}$ to be in phase with the input voltage $V_{IN}$, in order to meet certain power factor requirements.

The drive circuit 6 shown in FIG. 9 includes a clock generator 7 that is configured to provide a clock signal $S_{CLK}$. The clock signal $S_{CLK}$ includes signal pulses in accordance with a clock frequency $f_{CLK}$. This clock frequency $f_{CLK}$ defines the durations T of the drive cycles, where T is the reciprocal of the clock frequency $f_{CLK}$, that is, $T=1/f_{CLK}$. Referring to the explanation herein further below, the clock frequency $f_{CLK}$ is not fixed but varies in a predefined fashion.

The drive circuit 6 shown in FIG. 9 is configured to start a new drive cycle, that is, to generate an on-level of the drive signal $S_{DRV}$ at every signal pulse of the clock signal $S_{CLK}$. In this example, a flip-flop 62, such as an SR-flip-flop 62 receives the clock signal $S_{CLK}$ at a set input S. The drive signal $S_{DRV}$ is available at a non-inverting output Q of this flip-flop 62 in the example shown in FIG. 9. Optionally, the drive signal $S_{DRV}$ is available at an output of a driver 64 that receives the output signal of the flip-flop 62 and generates the drive signal $S_{DRV}$ based on this output signal.

Figure 10:
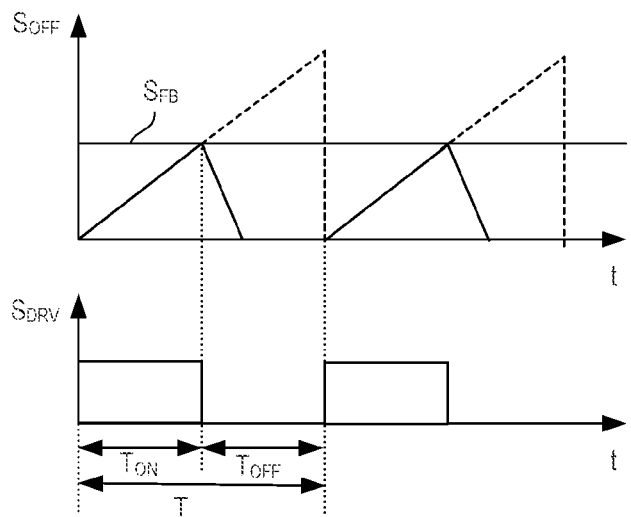
FIG. 10 shows timing diagrams of signals that may occur in the drive circuit shown in FIG. 9.

An off-level of the drive signal $S_{DRV}$ in order to switch off the at least one electronic switch 23 is generated each time a second reference signal $S_{REF2}$ reaches the feedback signal $S_{FB}$. A comparator 63 compares the feedback signal $S_{FB}$ with the second reference signal $S_{REF2}$ and resets the flip-flop 62 each time a further reference signal $S_{OFF}$ reaches the feedback signal $S_{FB}$. This is illustrated in FIG. 10 in which timing diagrams of the feedback signal $S_{FB}$, the further reference signal $S_{OFF}$ and the drive signal $S_{DRV}$ are shown. According to one example, the further reference signal $S_{OFF}$ represents the current I23 through the at least one inductor 23. In a flyback converter, the second reference signal $S_{REF2}$ may represent the current $I23_P$ through the primary winding $23_P$ of the transformer 23. According to another example, the further reference signal $S_{OFF}$ is a sawtooth signal generated by a sawtooth generator in accordance with the clock signal $S_{CLK}$. Such sawtooth signal is illustrated in dashed lines in FIG. 10.

Figure 11:
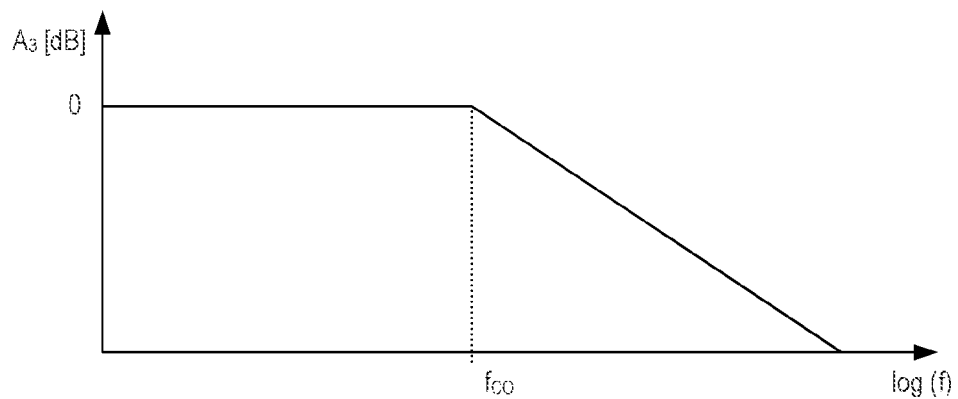
FIG. 11 illustrates one example of an attenuation characteristic of the filter.

Referring to the above, the filter 3 may be a low pass filter. An attenuation characteristic of a low pass filter is schematically illustrated in FIG. 11 on a logarithmic scale. In FIG. 11, $A_3$ denotes the attenuation of the filter 3 and f denotes the frequency. The filter 3 has a pass region where the amplification is one (1) and the attenuation is 0 dB. A falling edge of the low pass filter substantially starts at a cutoff frequency $f_{CO}$, whereas the cutoff frequency is the frequency where an attenuation of the filter is −3 dB (which is not explicitly shown in Figure 11 where the attenuation characteristic is approximated by straight lines, a horizontal line representing the pass region and a slanted line representing the attenuation region). A slope of the falling edge is dependent on a specific design of the filter 3. The slope is −20 dB/decade, for example, if the filter 3 is a first order filter, or −40 dB/decade if the filter 3 is a second order filter.

Figure 12:
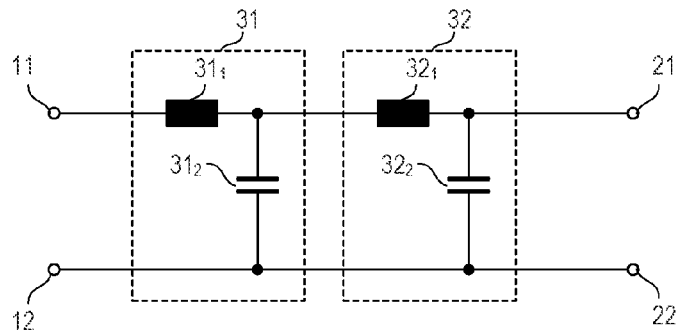
FIG. 12 shows one example of a second order filter.

One example of a second order filter is shown in FIG. 12. In this example, the filter includes two LC-stages 31, 32 that are cascaded between the input 11, 12 and the input 21, 22 of the converter stage. Each LC stage 31, 32 includes an inductor $31_1$, $32_1$ and a capacitor $31_2$, $32_2$. A series circuit with the inductor $31_1$ and the capacitor $31_2$ of the first stage 31 is connected between the first input node 11 and the second input node 12. A series circuit with the inductor $32_1$ and the capacitor $32_2$ of the second stage 32 is connected in parallel with the capacitor $31_1$ of the first stage 31. The input 21, 22 of the converter stage is connected to the capacitor $32_2$ of the second stage 32.

The cutoff frequency $f_{CO}$ of the low pass filter can be adjusted by suitably designing the inductances $31_1$, $32_1$ and the capacitors $31_2$, $32_2$ of the LC stages 31, 32. In general, a physical size of the filter 3, in particular of the inductances $31_1$, $32_1$ increases as the cutoff frequency $f_{CO}$ decreases.

Figure 13:
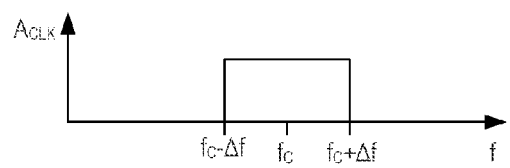
FIG. 13 illustrates a symmetric frequency spectrum of a conventional drive signal used to drive an electronic switch in a switched mode power converter.

Referring to the above, the frequency of the clock signal $S_{CLK}$ and, therefore, the switching frequency of the electronic switch 23 may be varied in order to distribute interferences that may occur due to the switched mode operation over a predefined frequency range. FIG. 13 illustrates a frequency spectrum of a clock signal $S_{CLK}$ with a frequency that linearly varies between $f_C-\Delta f$ and $f_C+\Delta f$, so that spectral components of the frequency spectrum are equally distributed between $f_C-\Delta f$ and $f_C+\Delta f$, where $f_C$ denotes a center frequency and $\Delta f$ defines a frequency range within which the frequency varies. The spectrum shown in FIG. 13 is symmetric relative to the center frequency $f_C$.

Figure 14:
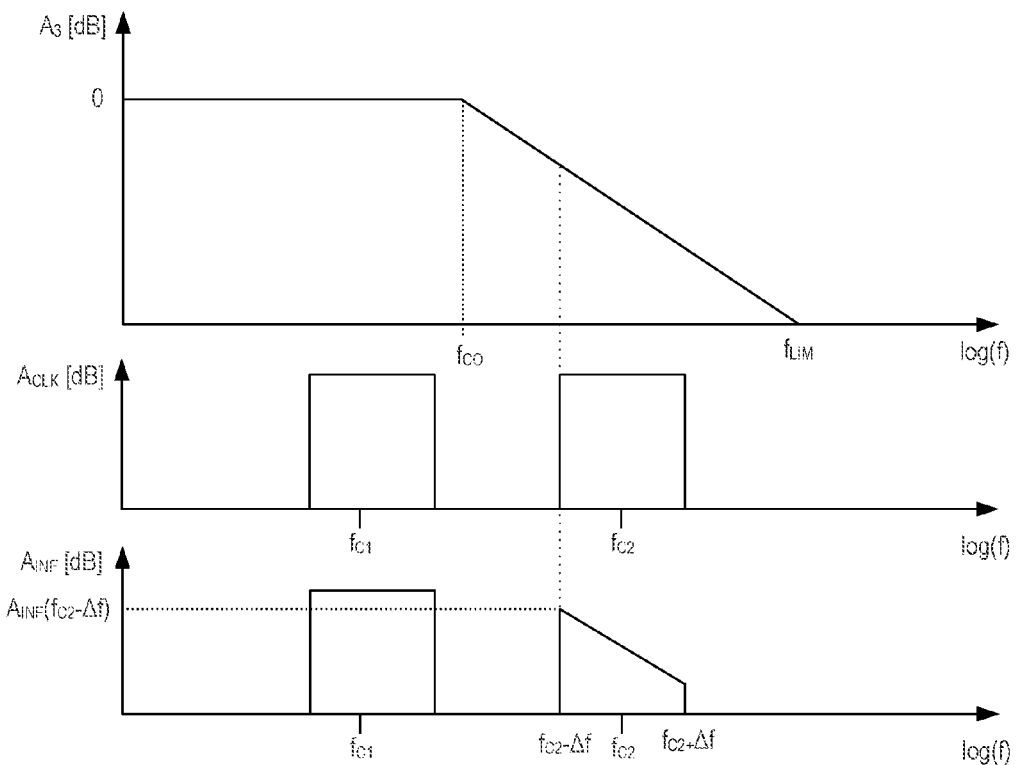
FIG. 14 shows symmetric frequency spectra of different drive signals before and after being filtered by a filter having an attenuation characteristic also shown in FIG. 14.

FIG. 14 again illustrates the example attenuation characteristic shown in FIG. 11. Additionally, FIG. 14 illustrates frequency spectra of the type shown in FIG. 12 with two different center frequencies $f_{C1}$, $f_{C2}$. A first center frequency $f_{C1}$ is smaller than the cutoff frequency $f_{CO}$ of the filter, and a second center frequency $f_{C2}$ is higher than the cutoff frequency $f_{CO}$. FIG. 14 furthermore shows interference spectra that result from filtering the two different frequency spectra with the two different center frequencies $f_{C1}$, $f_{C2}$ by the filter 3. The spectrum with the lower center frequency $f_{C1}$ passes the filter substantially unchanged. The spectrum with the higher center frequency $f_{C2}$ is attenuated by the filter, whereas due to the falling edge of the filter characteristic the resulting interference spectrum is asymmetric relative to the center frequency $f_{C2}$.

If, for example, a slope of the falling edge of the attenuation characteristic is −40 dB and the signal spectrum is symmetric, as shown in FIG. 14, a slope of the resulting interference characteristic is also −40 dB. In a switched mode power supply, the switching frequency is typically in a range of between several 10 kHz and several 100 kHz.

In the example shown in FIG. 14, the interference spectrum has its maximum at the lowest frequency $f_{C2}-\Delta f$ of the clock signal spectrum, whereas the magnitude of the interference spectrum decreases as the frequency increase. The maximum is referred to as $A_{INF}(f_{C2}-\Delta f)$ and is given by the constant magnitude of the clock signal spectrum multiplied with the magnitude (attenuation) $A_3(f_{C2}-\Delta f)$ of the filter at the frequency $f_{C2}-\Delta f$. There are standards that define the admissible amplitude of the interference spectrum dependent on the frequency. The "admissible amplitude" is also referred to as limit in the following.

Figure 15:
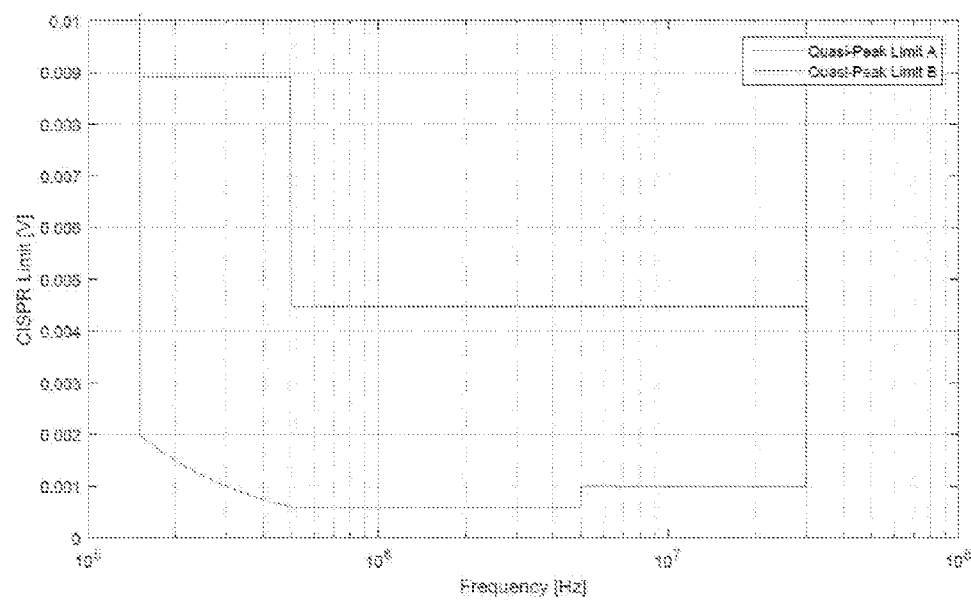
FIG. 15 illustrates acceptable interference (noise) spectra according to CISPR Class A and B.

FIG. 15 illustrates the limits of interference spectra according to two different standards, CISPR Class A and Class B. According to CISPR Class B, for example, the limit of an interference spectrum is 2 millivolts (mV) at 150 kHz and decreases to about 0.6 millivolts at 500 kHz. According to CISPR Class A, for example, the limit of an interference spectrum is about 9 millivolts between 150 kHz and 500 kHz and 4.5 millivolts between 500 kHz and 30 MHz.

Figure 16:
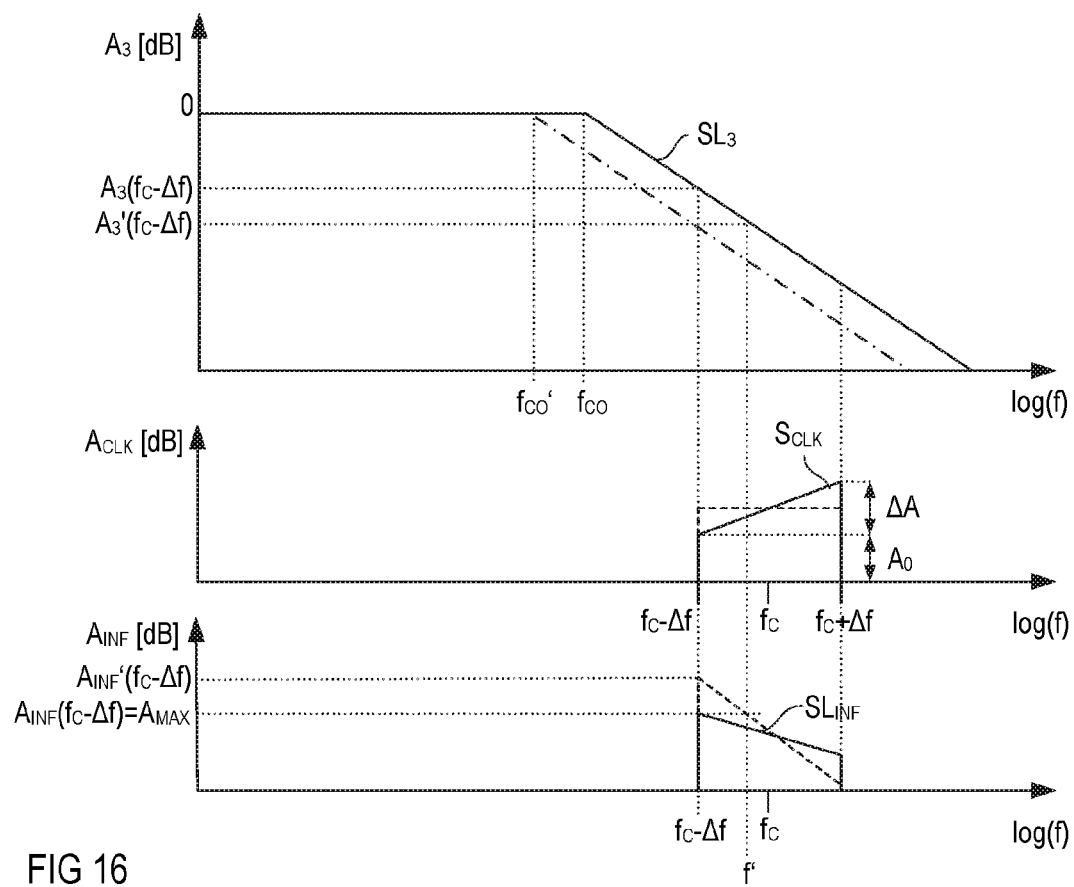
FIG. 16 shows an symmetric frequency spectrum of a drive signal before and after being filtered by a filter having an attenuation characteristic also shown in FIG. 14.

According to one example, the clock generator 7 is configured to modulate the switching frequency $f_{CLK}$ such that a spectrum of the clock signal $S_{CLK}$ and, therefore the spectrum of the drive signal $S_{DRV}$, the switching frequency of which is defined by the clock signal $S_{CLK}$, is asymmetric. One example of an asymmetric frequency spectrum of the clock signal $S_{CLK}$ is shown in FIG. 16. The spectrum has a center frequency $f_C$ and ranges from $f_C-\Delta f$ to $f_C+\Delta f$. The spectrum is asymmetric such that the magnitude increases towards higher frequencies. The filter 3, at frequencies higher than the cutoff frequency $f_{CO}$ has an opposite characteristic, that is, the magnitude of $A_3$ decreases towards higher frequencies so that the attenuation increases. The center frequency $f_C$ of the clock signal spectrum may be higher than the filter cutoff frequency $f_{CO}$.

FIG. 16 furthermore illustrates an interference spectrum of interferences obtained by filtering the clock signal spectrum by the filter 3. In the example, the interference spectrum is also asymmetric relative to the center frequency $f_C$ but with a smaller slope $S_{INF}$. By virtue of the asymmetric spectrum a filter with a higher cutoff frequency may be used. This is explained with reference to FIG. 16 in the following. Using a filter with a higher cutoff frequency may be beneficial because the filter size decreases as the cutoff frequency increases. Referring to FIG. 16, the interference spectrum resulting from the asymmetric clock spectrum has its maximum magnitude at a frequency of $f_C-\Delta f$, which is the minimum frequency, The magnitude at this frequency is referred to as $A_{INF}(f_C-\Delta f)$ in the following.

The dashed lines in FIG. 16 illustrate a symmetrical frequency spectrum of a clock signal and an interference spectrum resulting from this symmetrical spectrum, respectively. The interference spectrum has its maximum magnitude also at the frequency $f_C-\Delta f$. This maximum magnitude, which is referred to as $A'_{INF}(f_C-\Delta f)$, is greater than the maximum magnitude $A_{INF}(f_C-\Delta f)$ of the interference spectrum resulting from the asymmetric spectrum. For the purpose of explanation it is assumed that $A_{INF}(f_C-\Delta f)=A_{MAX}$, where $A_{MAX}$ is the maximum magnitude that is acceptable according to a standard such as CISPR Class A or Class B. The interference spectrum resulting from the symmetric clock frequency spectrum falls below this maximum at a frequency f', which is higher than fc−Δf and where the filter has an attenuation A3 (f') that is lower than the attenuation A3 (fc−Δf) at the frequency fc−Δf. In order to attenuate the symmetric clock frequency spectrum such that the maximum magnitude at fc−Δf is equal to or lower than $A_{MAX}$ a filter with an attenuation characteristic that is illustrated in dashed and dotted lines in FIG. 16 would be required. This filter has a cutoff frequency $f_{CO}'$ that is lower than the cutoff-frequency $f_{CO}$ of the filter that is sufficient to attenuate the asymmetric clock frequency spectrum such that the maximum magnitude is equal to or below $A_{MAX}$. Thus an asymmetric clock frequency spectrum may not only help to suitably shape the slope of the resulting interference spectrum but may also help to allow the use of a filter with a higher cutoff-frequency.

Figure 17:
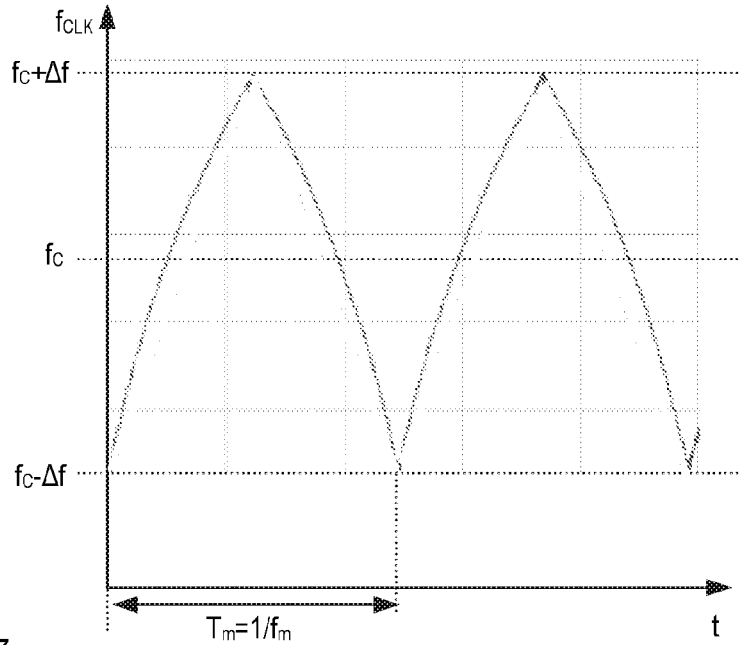
FIG. 17 shows a timing diagram of a switching frequency of a drive signal with an asymmetric frequency spectrum.

Basically, the slope $S_{INF}$ of the interference spectrum is given by the slope of the signal spectrum $S_{CLK}$ minus the slope $S_3$ of the filter, that is, $SL_{INF}=S_{CLK}+S_3$. If for, example, the filter slope is −40 dB/decade and if the slope $S_{CLK}$ of the clock signal spectrum is adjusted to be 20 dB/decade, the slope of the interference spectrum is −20 dB/decade, which, referring to FIG. 14, is less than the slope of an interference spectrum obtained by filtering a clock signal with a symmetric spectrum. The slope of the interference spectrum can be adjusted by adjusting the slope of the clock signal spectrum. In particular, by adjusting the slope of the clock signal spectrum the slope of the interference spectrum may be adjusted such that the magnitude of the interference spectrum, over its entire frequency range, is below the limit given by the relevant standard. If, for example, the interference spectrum has its frequency range between 150 kHz and 500 kHz (where the limit according to CISPR Class B decreases as the frequency increases) and if it is desired to have the interference spectrum in compliance with CISPR Class B the slope of the clock signal spectrum, dependent on the falling slope of the filter attenuation characteristic, may be adjusted such that the interference spectrum has a falling slope equal to or steeper than the falling slope defined by CISPR Class B in the 150 kHz to 500 kHz frequency range. FIG. 17 shows a timing diagram that illustrates one example of how the clock frequency $f_{CLK}$ may be varied in order to obtain an asymmetric clock signal spectrum of the type shown in FIG. 15. In the example shown in FIG. 16, the clock frequency periodically increases from $f_C-\Delta f$ to $f_C+\Delta f$ and decreases from $f_C+\Delta f$ to $f_C-\Delta f$. In FIG. 16, a modulation period has a duration $T_m$. In one modulation period, the frequency increases from $f_C-\Delta f$ to $f_C+\Delta f$ and decreases back from $f_C+\Delta f$ to $f_C-\Delta f$. A reciprocal $f_m=1/T_m$ of the duration $T_m$ of one modulation period is referred to as modulation frequency in the following. The modulation frequency $f_m$ is smaller than the center frequency $f_C$. According to one example, the center frequency $f_m$ is selected from a range of between 50 kHz and 500 kHz, $\Delta f$ is selected from a range of between 5% and 20% of the center frequency, and the modulation frequency is selected from between 1% and 5% of the center frequency $f_C$.

Referring to FIG. 17, both the increase and the decrease are not linear, that is, in the rising edge and the falling edge of the frequency profile shown in FIG. 17 time derivative $d(f_{CLK})/dt$ of the frequency $f_{CLK}$ is not constant. More specifically, in the example shown in FIG. 17, a magnitude of the time derivative $d(f_{CLK})/dt$ is dependent on the frequency $f_{CLK}$, that is, the time derivative $d(f_{CLK})/dt$ is a function of the frequency, that is, $d(f_{CLK})/dt = g(f_{CLK})$, where $g(f_{CLK})$ is a function of the frequency. In the example shown in FIG. 17, the magnitude of the time derivative $d(f_{CLK})/dt$ decreases as the frequency $f_{CLK}$ increases.

Figure 18:
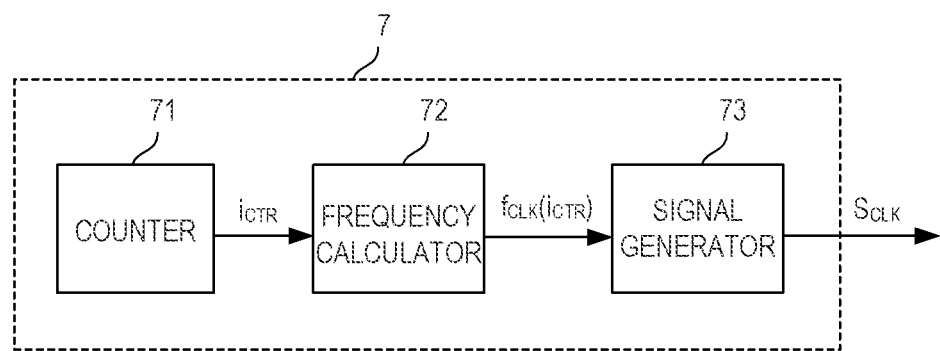
FIG. 18 shows one example of a clock generator of the drive circuit shown in FIG. 9 configured to generate a clock signal with an asymmetric frequency spectrum.
Figure 19:
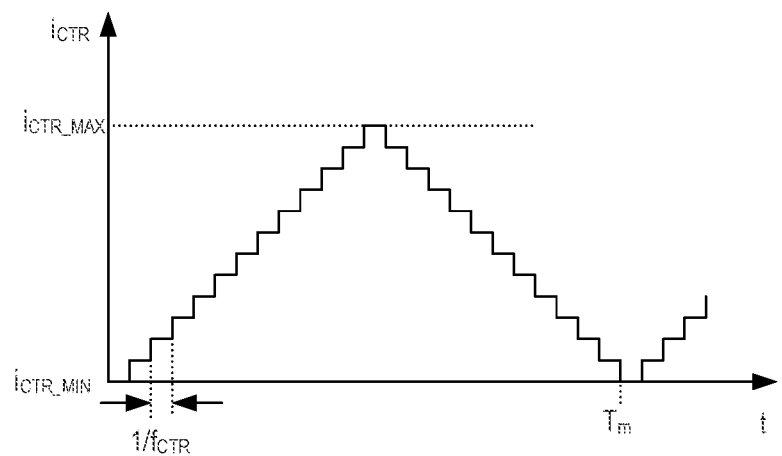
FIG. 19 illustrates one way of operation of a counter included in the clock generator shown in FIG. 18.

FIG. 18 shows a block diagram of a clock generator 7 according to one example that is configured to generate the clock signal $S_{CLK}$ such that a frequency spectrum is asymmetric, which is equivalent to that the frequency $f_{CLK}$ varies in a non-linear fashion as shown in FIG. 17. The clock generator 7 shown in FIG. 18 includes a counter that generates a counter value $i_{CTR}$. According to one example shown in FIG. 19 the counter is configured to periodically count from a minimum value $i_{CTR\_MIN}$ to a maximum value $i_{CTR\_MAX}$ and back to the minimum value $i_{CTR\_MIN}$. A period in which the counter once counts from the minimum value $i_{CTR\_MIN}$ to the maximum value $i_{CTR\_MAX}$ and back to the minimum value $i_{CTR\_MIN}$ is the modulation period with the duration $T_m$. A counter frequency is $f_{CTR}$, that is the counter generates a new value at the end of every time period with a duration $1/f_{CTR}$. According to one example, as shown in FIG. 19, the counter 71 is configured to count in equal steps, that is, a magnitude of a difference between timely successive counter values is constant.

According to one example, the minimum counter value $i_{CTR\_MIN}$ is zero, $i_{CTR\_MIN}=0$. According to one example, the maximum counter value $i_{CTR\_MAX}$ is given by $$i_{CTR\_MAX} = 10^{\frac{\Delta A}{20}} - 1, \tag{1}$$

where $\Delta A$, referring to FIG. 16, is the difference between that maximum and the minimum spectral component of the clock signal spectrum. $\Delta A$, in turn is dependent on the desired slope $SL_{CLK}$ of the clock signal spectrum as follows:

$$\Delta A = S_{CLK} \cdot \log\left(\frac{f_C + \Delta f}{f_C - \Delta f}\right). \tag{2}$$

Referring to FIG. 18, a frequency calculator 72 receives the counter values $i_{CTR}$ output by the counter and calculates the clock frequency $f_{CLK}$ dependent on the counter values $i_{CTR}$, that is, the frequency $f_{CLK}$ is a function of the counter values $i_{CTR}$. A signal $f_{CLK}(i_{CTR})$ output by the frequency calculator 72 represents the clock frequency $f_{CLK}$. A signal generator 73 receives the output signal of the frequency calculator 72 and generates the clock signal $S_{CLK}$ with a frequency as defined by the output signal $f_{CLK}(i_{CTR})$.

The clock generator 7 shown in FIG. 18 may be implemented using a digital signal processor. The blocks shown in FIG. 18, therefore, are rather functional blocks than physical circuit blocks.

According to one example, the frequency calculator 72 calculates the frequency $f_{CLK}(i_{CTR})$ based on the counter value $i_{CTR}$ as follows:

$$f_{CLK}(i_{CTR}) = \log(i_{CTR} + 1) \cdot 2 \cdot \Delta f \cdot \frac{20}{\Delta A} + f_C - \Delta f. \tag{3}$$

In this example, the clock frequency $f_{CLK}$ is dependent on a logarithmic function of the counter value $i_{CTR}$ or, more precisely, the counter value plus 1. According to another example, the frequency calculator 72 calculates the frequency $f_{CLK}(i_{CTR})$ based on the counter value $i_{CTR}$ as follows:

$$f_{CLK}(i_{CTR}) = \left[\left(i_{CTR} \cdot \left(10^{\frac{\Delta A}{20}} - 1\right) + 1\right)^{\frac{20}{S_{CLK}}} - 1\right] \cdot (2f_C - \Delta f) + f_C - \Delta f. \tag{4}$$

In this example, the clock frequency is dependent on an exponential function of the counter value $i_{CTR}$.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A switched mode power supply, comprising:
   an input configured to receive an input power and an output configured to supply an output power;
   at least one converter stage comprising at least one electronic switch and at least one inductor coupled to the at least one electronic switch, wherein the converter stage is coupled to the output;
   a filter coupled between the input and the at least one converter stage; and
   a controller configured to drive the at least one electronic switch based on a clock signal,
   wherein the controller is configured to modulate a clock frequency of the clock signal over a predefined first frequency range such that a frequency spectrum of the clock signal is asymmetric.

2. The switched mode power supply of claim 1,
wherein the filter is a lowpass filter with an attenuation characteristic that has a falling slope in a second frequency range,
wherein the predefined first frequency range and the second frequency range at least partially overlap.

3. The switched mode power supply of claim 2, wherein the predefined first frequency range is within the second frequency range.

4. The switched mode power supply of claim 1, wherein the frequency spectrum of the clock signal is asymmetric such that a magnitude of the frequency spectrum monotonically increases between a lower end of the predefined first frequency range and an upper end of the predefined first frequency range.

5. The switched mode power supply of claim 4,
wherein the slope of an attenuation characteristic of the lowpass filter is −40 dB/decade, and
wherein the slope of the frequency spectrum is less than 20 dB/decade.

6. The switched mode power supply of claim 1, wherein the controller comprises:
a counter configured to generate a counter value;
a frequency calculator configured to receive the counter value and calculate the clock frequency based on the counter value; and
a signal generator configured to generate the clock signal based on the clock frequency calculated by the frequency calculator.

7. The switched mode power supply of claim 6, wherein the counter is configured to periodically count from a minimum value to a maximum value and back to the minimum value at a predefined counter frequency.

8. The switched mode power supply of claim 6, wherein the frequency calculator is configured to calculate the clock frequency to be dependent on a logarithmic function of the counter value.

9. The switched mode power supply of claim 6, wherein the frequency calculator is configured to calculate the clock frequency to be dependent on an exponential function of the counter value.

10. The switched mode power supply of claim 1,
wherein the predefined first frequency range has a center frequency; and
wherein the frequency spectrum of the clock signal being asymmetric comprises the frequency spectrum of the clock signal being asymmetric relative to the center frequency.

11. A method comprising:
driving at least one electronic switch coupled to at least one inductor in a converter stage of a switched mode power supply based on a clock signal; and
modulating a clock frequency of the clock signal over a predefined first frequency range around a center frequency such that a frequency spectrum of the clock signal is asymmetric,
wherein the switched mode power supply further comprises a filter coupled between the converter stage and an input of the switched mode power supply.

12. The method of claim 11,
wherein the filter is a lowpass filter with an attenuation characteristic that has a falling slope in a second frequency range,
wherein the predefined first frequency range and the second frequency range at least partially overlap.

13. The method of claim 12, wherein the predefined first frequency range is within the second frequency range.

14. The method of claim 11, wherein the frequency spectrum of the clock signal is asymmetric such that a magnitude of the frequency spectrum monotonically increases between a lower end of the predefined first frequency range and an upper end of the predefined first frequency range.

15. The method of claim 14,
wherein the slope of the attenuation characteristic of the lowpass filter is −40 dB/decade, and
wherein the slope of the frequency spectrum is less than 20 dB/decade.

16. The method of claim 11, wherein modulating the clock frequency comprises:
generating a counter value;
calculating the clock frequency based on the counter value; and
generating the clock signal based on the calculated clock frequency.

17. The method of claim 16, wherein generating the counter value comprises periodically counting from a minimum value to a maximum value and back to the minimum value at a predefined counter frequency.

18. The method of claim 16, wherein calculating the clock frequency comprises calculating the clock frequency to be dependent on a logarithmic function of the counter value.

19. The method of claim 16, wherein calculating the clock frequency comprises calculating the clock frequency to be dependent on an exponential function of the counter value.

20. The method of claim 11, wherein the frequency spectrum of the clock signal being asymmetric comprises the frequency spectrum of the clock signal being asymmetric relative to the center frequency.

* * * * *